United States Patent

[11] 3,617,590

| [72] | Inventors | Harry O. Neukomm<br>Sugar Loaf Lane, Wilmington, Del. 19808;<br>Harold E. Graham, 2415 Rambler Road,<br>Wilmington, Del. 19803 |
|---|---|---|
| [21] | Appl. No. | 605,657 |
| [22] | Filed | Dec. 29, 1966 |
| [45] | Patented | Nov. 2, 1971 |

[54] PROCESS FOR PRODUCING THERMOPLASTIC FILTER MATERIAL
1 Claim, 3 Drawing Figs.

[52] U.S. Cl. .................................................. 264/37,
264/25, 264/69, 264/118
[51] Int. Cl. ...................................................... B29b 3/00,
B06b 1/00
[50] Field of Search .......................................... 55/523,
522, 524, 512, 518, 387; 264/109, 117, 118, 119,
140, 145, 69, 37; 241/3, 4, 277; 75/200; 210/503,
506, 510

[56] References Cited
UNITED STATES PATENTS

| 1,321,201 | 11/1919 | Young............................ | 241/3 X |
| 1,842,801 | 1/1932 | Rodgers, Jr. et al. ......... | 264/145 X |
| 1,937,446 | 11/1933 | Stampe......................... | 241/277 X |
| 2,016,401 | 10/1935 | Thomas......................... | 210/510 X |
| 2,099,379 | 11/1937 | Spellacy ....................... | 209/234 X |
| 2,327,087 | 8/1943 | Austin........................... | 241/3 X |
| 2,335,515 | 11/1943 | Jehle ............................ | 83/6 |
| 2,461,089 | 2/1949 | Smidth......................... | 241/3 |
| 2,554,343 | 5/1951 | Pall .............................. | 210/510 |
| 2,577,606 | 12/1951 | Conley ......................... | 55/512 X |
| 2,658,583 | 11/1953 | Fitzgerald..................... | 55/518 |
| 2,745,513 | 5/1956 | Massey......................... | 55/523 X |
| 2,755,509 | 7/1956 | Smidth......................... | 264/140 |
| 2,977,214 | 3/1961 | McLellan ..................... | 71/64 |
| 2,978,064 | 4/1961 | Deaver......................... | 55/387 |
| 3,151,187 | 9/1964 | Comte.......................... | 261/3 |
| 3,171,151 | 3/1965 | Sickle et al. .................. | 15/118 |
| 3,246,767 | 4/1966 | Pall et al. ..................... | 117/152 X |
| 3,252,270 | 5/1966 | Pall et al. ..................... | 55/74 |

OTHER REFERENCES

" Intalox Saddle Packing," The United States Stoneware Company Bulletin S-29-R-1, Feb. 1, 1959, pages 1, 5, 9, and 14 (copy in Group 177, class 261 subclass 94).

Primary Examiner—Robert F. White
Assistant Examiner—Richard H. Shear
Attorney—Synnestvedt & Lechner ABSTRACT: A superior thermoplastic filter material results when the individual particles each comprise a plurality of smaller particles partially fused or sintered together. The particulate material has a low bulk density and a high surface-to-volume ratio, causes a materially lower pressure drop, and has a lower resistance to fluid flow than a material having particles of other shapes.

Such a filter material can be produced by partially fusing together thermoplastic particles of smaller size than that desired and grinding the fused particles to obtain the desired size. A preferred manner for doing this comprises forming a thin layer of particles, fusing a portion of the layer by application of heat to form a partially fused ribbon, separating the fused ribbon from the unfused particles, and grinding it to produce a filter material of the desired size.

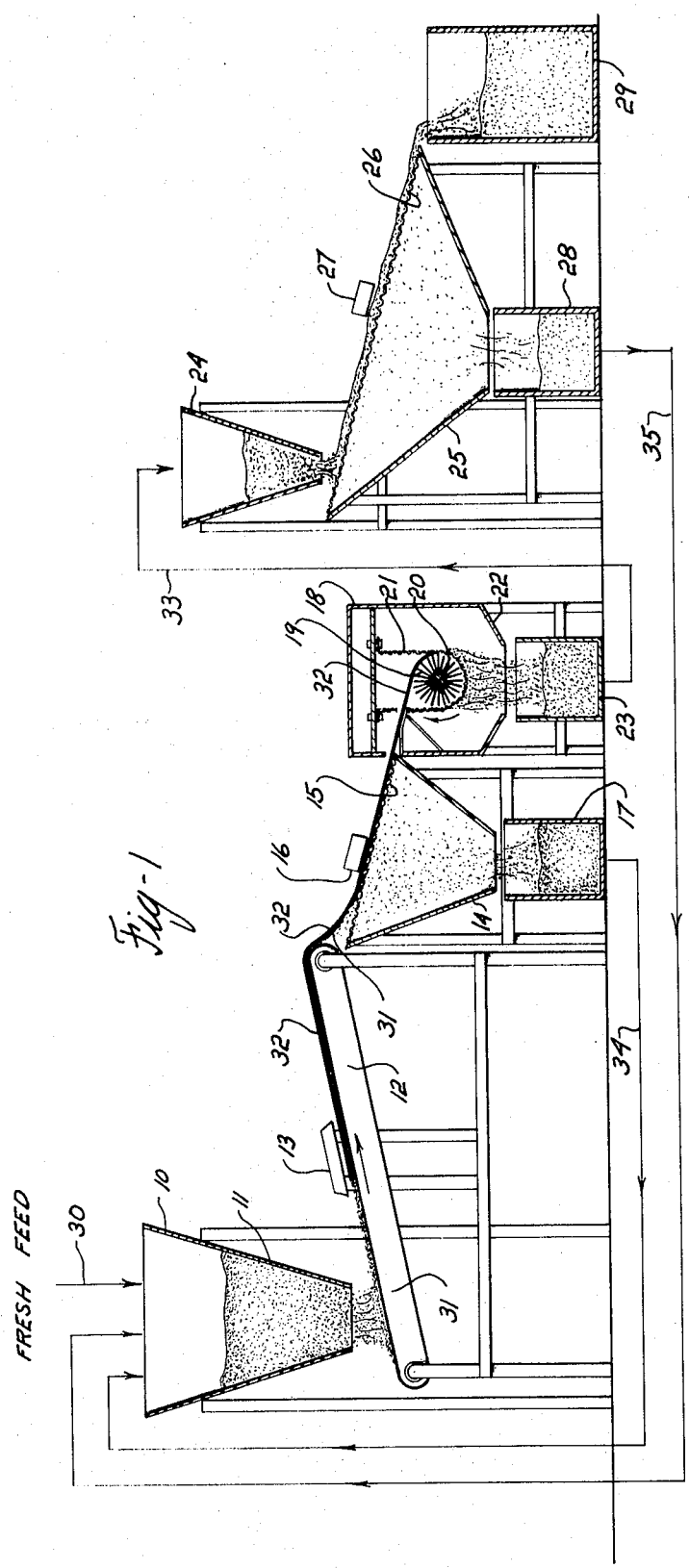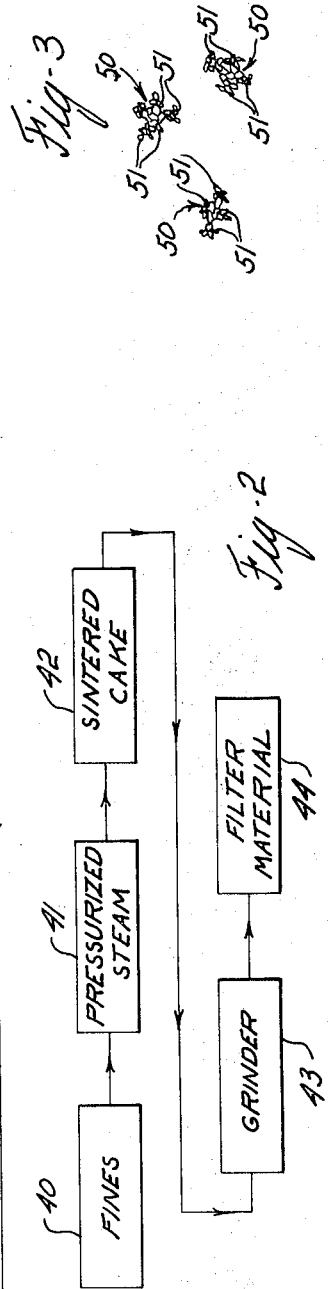

PROCESS FOR PRODUCING THERMOPLASTIC FILTER MATERIAL

This invention relates to an improved filter element, and to a process for producing it.

In filter elements which are used for various purposes, including, for example, the removal of oil base aerosols from gas streams, certain properties are desirable. Among these are low bulk density, and a high surface-to-volume ratio of the filter material. In a good filter material, these properties, and others, combine to yield a relatively low pressure drop across a filter element, and this too can be thought of as a desirable property. A low pressure drop across a filter element can be exploited in several ways. First, the energy expended in moving the material to be filtered through the filter element can be reduced. Second, the low pressure drop element can be employed in conjunction with other filter elements, for example, upstream elements for coalescing liquid impurities to larger droplet size to facilitate removal thereof, without exceeding a practical maximum total pressure drop. By using a combination of filter elements including an initial element for coalescing purposes, and a filter element using the filter material of the present invention for removal purposes, the total impurity-holding capacity of a filter unit can be considerably increased.

The improved filter material of the present invention is a particulate thermoplastic, such as polypropylene, styrene polyethylene, polyvinyl chloride, polycarbonate, standard copolymers of these, and others. Such a material is particularly effective for removing oil from gas streams, such as the entrained compressor oil in compressed air lines.

We have devised a superior thermoplastic filter material in which the individual particles of the filter material comprise a plurality of smaller particles which are fused, or sintered, together. Such particles have a very irregular surface, a high surface-to-volume ratio, and, taken in gross, a low bulk density. As pointed out above, these are extremely desirable properties for a good filter medium. The filter material of the invention is superior to a filter material made from the same thermoplastic, but not incorporating the individual particulate structure described above. That is to say, filter elements made in accordance with the invention from a given thermoplastic and having particles as described above, are superior to filter elements made from particles of the same thermoplastic and of the same size, naturally resulting from the synthesis of the thermoplastic, and are also superior to filter elements produced by grinding large particles of the thermoplastic down to the desired size.

According to the preferred form of the invention, the particulate thermoplastic filter material, with fused or sintered particles, is one in which the particles are of a dominant preselected size range, although it may also contain particles outside the preselected size range.

It may be observed that the particles making up the filter material of the invention can roughly be analogized to pieces of popped corn, insofar as shape is concerned, (although they have much greater internal void space than popcorn) and this analogy may be of help in visualizing how the superior filtering properties of the material are attained. The filter material of the invention characteristically has a void volume (percent of a mass occupied by voids) of about 70 to 75 percent.

According to another aspect of the invention, there are provided processes for producing particulate filter material having the structure and properties just described. In its broad outline, the process of the invention includes forming a mass of thermoplastic particles containing high proportion of particles smaller than the particle size desired for the final filter material. This mass of small particles is heated to a point near the melting point of the thermoplastic, so that at least a portion of the mass is fused or sintered together. The sintered mass is then ground into particulate form, the resulting particles being generally of preselected size, and having the popcornlike shape described above.

The preferred form of the above process of producing the thermoplastic filter material, again in broad outline, includes the formation of a thin layer (or mass) of thermoplastic "fines," that is a layer of particles generally smaller than those desired in the final filter material, heating the surface of the layer to fuse or sinter particles near the surface of the layer and for some distance into the layer, to form a partially fused, rather fragile, ribbon of the thermoplastic material. This fused ribbon is then ground, preferably in a brush and screen grinder, to yield the filter material. If desired, the product of the grinding operation, can be further screened or classified to remove "fines" which tend to increase the pressure drop across the material during use.

It is an object of the present invention to provide an improved particulate thermoplastic filter material having a low bulk density and a high surface-to-volume ratio.

It is a further object of the invention to provide a process for producing such a particulate thermoplastic filter material.

A related object of the invention is the provision of a process for producing a particulate thermoplastic material, the particles of which have a dominant preselected size range, which process can readily use as a starting material thermoplastic "fines" of a size generally unsuitable and undesirable for use as a filter material.

Further objects, as well as the above objects, may be more readily understood from a consideration of the detailed description which follows along with the accompanying drawings in which:

FIG. 1 is a somewhat diagrammatic sectional elevational view of equipment suitable for practicing the process of the present invention to produce the filter material of the present invention, in which figure some of the flow paths of material are shown as solid lines:

FIG. 2 is a block diagram illustrating an alternate form of the process; and

FIG. 3 is a somewhat diagrammatic illustration of several individual particles of the particulate thermoplastic filter material of the invention produced by the process of the invention.

Turning now to FIG. 1, it can be seen that the equipment shown there includes a feed hopper 10 containing powdered thermoplastic feed stock 11. In the form in which powdered thermoplastics are commonly obtained from basic particles thereof, they commonly contain particles of a variety of sizes including a large proportion of very small particles or "fines," and a relatively small proportion of particles of a size desirable for a filter material, such as 10 mesh. The feed stock 11 may comprise principally or entirely "fines," or it may comprise powder in the as-received condition, which includes both "fines" and a range of larger particles.

As can be seen from FIG. 1, the feed hopper 10 is positioned over a conveyor belt 12, which is conventionally powered so that the upper run thereof moves from left to right as FIG. 1 is drawn. To the right of hopper 10, over the belt 12, there is mounted a heating means 13, which may be in the form of one or more infrared lamps, or electric resistance heaters.

It should be noted that the conveyor 12 extends to the right of the heating means 13 for some distance so that the partially fused ribbon formed as thermoplastic powder passes under the heating means (in the manner described below) will cool sufficiently for handling in the further stages of the process.

At the right-hand end of the conveyor belt 12, is a separator screen unit 14 which includes a top screen surface 15, and a vibrator 16 for the screen surface. As can be seen in FIg. 1, the separator screen unit 14 extends under the right-hand end of the conveyor belt 12, and is more or less funnel shaped. Beneath the open bottom of the separator unit 14, is a container 17 for catching "fines" separated out by the screen separator unit 14 as described below.

Positioned to the right of screen separator unit 14, as FIG. 1 is drawn, is grinder unit 18. The grinder unit 18 is of the brush and screen type, and includes one or more wire brush wheels 19 mounted on axle 20. FItted around the greater part of the circumference of wire brush wheels 19 is screen 21. The screen 21 may be of the woven type, or of the perforated sheet type, and the mesh size is selected in view of the desired particle size of the filter material being produced. For example, when it is desired to have a dominant particle size in the filter material in the neighborhood of 10 mesh to 30 mesh, a screen size for the screen 21 of 8 mesh is quite suitable. The wire brushes 19 are driven, in a clockwise direction as FIG. 1 is drawn, by conventional power means at preselected speed. The grinder unit 18 has a funnel-shape opening 22 at the bottom thereof which delivers the ground filter material into container 23.

It may be desired to effect a further separation of "fines" from the filter material delivered into container 23, since, as pointed out above, "fines" tend to raise the pressure drop across the filter material. For this purpose additional equipment is shown in FIG. 1. This equipment includes a secondary feed hopper 24, a secondary screen, separator unit 25, which has a screen top 26 and is generally funnel shaped with an open bottom. The secondary separator screen unit 25, like the unit 14, is provided with a vibrator 27 for the screen surface. Beneath the secondary screen unit 25 is a container 28 for catching "fines" separated thereby. The final product is delivered into a container 29 positioned at the output end of secondary screen separator 25.

With the above description of the equipment of FIG. 1 in hand, the practice of the process of the invention by means of this equipment can now be described. Fresh feed material is placed in hopper 10 as indicated diagrammatically by the arrow 30. It is metered from the hopper 10 onto the conveyor belt 12 at a rate such that, when the speed of the belt is taken into account, a continuous moving layer 31 of thermoplastic "fines" (and larger particles if they are in the feed stock) having a thickness of about one-fourth inch is formed. In a typical operation, the surface of the conveyor belt moves at about 3 feet per second. The thin layer 31 of thermoplastic particles is carried to the right by conveyor belt 12. As it moves to the right it passes beneath heater means 13. The heat output of heater means 13 is adjusted so that the top portion of the layer 13 of thermoplastic particles is partially fused or sintered into a ribbon. The total heat supplied to the layer of particles is less than that required to totally melt it, or to raise the total mass of the particles to the melting point. However, sufficient heat is supplied so that there are widespread localized regions of softening or melting in the upper portion of the layer of particles, and in these localized regions the temperature may approach or exceed the melting point. The depth of the powder bed, the supply of heat by heater means 13, and the speed of conveyor belt 12, can readily be adjusted so that there is formed a thin, relatively coherent, fused but unmelted ribbon 32 on the conveyor belt made up of the particles in the upper portion of the layer 31 on the conveyor belt. The ribbon 32 is comprised of fused or sintered-together particles, and generally has a thickness of between one thirty-second and one-sixteenth of an inch. It will be found that if one attempts to form a ribbon of much greater thickness, the thermoplastic particles nearest the heater will tend to melt completely rather than fuse, and as pointed out above, this is undesirable.

As the partially fused ribbon 32 moves to the right on conveyor 12 beyond heating means 13, it cools sufficiently to gain the strength required for the succeeding stages of the process.

The ribbon 32 and the layer of "fines" 31 are fed off the right-hand end of the conveyor belt 12 together onto the screen surface 15 of separator screen unit 14. The remaining unfused particles in layer 31 fall through the screen and into container 17, while the ribbon 32 continues to pass to the right across the screen surface 13. The separating action thus accomplished is facilitated by the action of screen vibrator 16 which shakes the particles of layer 31 through the screen, without disrupting ribbon 32. Thus it can be seen that layer 31 is, in a sense, dissipated by the screen separator unit 14.

The ribbon 32 is then fed into the grinder unit 18, where it is delivered across the top of the wire brush wheels 19 and into the nip between the wire brush wheels 19, and the screen 21. The wire brush wheels rotate clockwise as FIG. 1 is drawn, and their circumferential velocity is somewhat larger than the linear velocity of the ribbon being fed into the nip. In this way backup is avoided. For illustration, with a typical ribbon speed of about 3 feet per second established by conveyor belt 12, a circumferential brush speed of about 3 ½ feet per second is quite suitable. Excessive brush speed, such as twice the ribbon speed, should be avoided, since this tends to prematurely tear the ribbon and interrupt the feed thereof into the nip.

As the brushes 20 rotate across screen 21, the ribbon of fused particles is disintegrated by the abrasive action of the brushes and the screen upon it, and the particles of the disintegrated ribbon are forced through the screen 21 and ultimately fall out of the grinder 18 into container 23. The material in container 23 may be suitable for some filter applications without further processing. However, to gain further uniformity of particle size and to further eliminate undesirable "fines," further processing is generally preferred.

Before describing the further processing it should be pointed out that the portions of the equipment described so far to practice the process can, if desired, be run separately rather than together. That is to say, the conveyor belt and separator screen can be used to form a ribbon such as 32, and to removed the unfused "fines" from the ribbon, and the ribbon so formed can be gathered, as by rolling it up, instead of being fed directly to the grinder unit 18. The ribbon so gathered or rolled up can then be fed at a convenient time into a separately run grinder unit 18.

The material issuing from the grinder and collected in container 23 is preferably delivered for further processing to secondary hopper 24. This delivery is indicated diagrammatically by the line 33 on FIG. 1. It is then fed from hopper 24 onto secondary screen unit 25 and as it slides down to the right on the screen plate 26, the undesirable small particles fall through the screen 26 and into container 28. The particles of desired size continue across the screen 26 and into container 29. Again, the efficiency of the separation of the screen separator 25 is enhanced by vibrator 27.

From the foregoing description it will be realized that "fines" are separated and collected at two points in the process: in container 17 which collects the "fines" from layer 31 as it is dissipated, and in container 28 which collects the "fines" from the semifinished material moving across screen 26. "Fines" from both these sources may be recycled to feed hopper 10 as indicated diagrammatically by the lines 34 and 35. By utilizing these two recycle streams waste of material is substantially completely eliminated.

In a large installation, the recycle from containers 17 and 28 to feed hopper 10 can be done by mechanical means, as can the transfer of semifinished material from container 23 to feed hopper 24. In smaller installations all of these transfers can conveniently be done by hand.

Attention is now directed to FIG. 2 which is a block diagram illustrating an alternate form in which the process of the invention may be practiced. In this form the process is most conveniently carried out in a batch-type system. Thermoplastic "fines," or powdered thermoplastic containing a large proportion of "fines" together with a distribution of larger particles form the starting material, and are represented by the box 40 in FIG. 2. The "fines" are placed in a suitable pressure-resisting container, such as a pressure cooker, together with a small amount of water. The container is then sealed and heat is applied until a condition of pressurized steam of about 60 pounds per square inch gauge is attained, and an internal temperature of about 307° F. is reached, these figures being appropriate for polypropylene as an example. Different conditions will apply for other thermoplastics, since their softening and melting points differ. This step of the process is represented by the box 41 in FIG. 2. The foregoing temperature and pressure conditions are maintained only a very short time; in fact, application of heat can be discontinued immediately upon reaching the above temperature. By this means the "fines" within the container are partially sintered or fused into a more or less coherent cake or article having a structure much like that of the ribbon 32 in the process according to FIG. 1. That is to say, the particles are fused or sintered together, but the material is not totally melted. The sintered cake so formed is more or less friable. It is represented by the box labeled 42 on FIG. 2.

As pointed out above, the heat is removed from the container and the pressure is allowed to fall off. The container is opened when the pressure has dropped to a safe level, and the sintered of fused cake is removed. It is then fed through a grinder represented by the box 43. For a sintered cake, a hammer mill-type grinder is the preferred type of equipment to be used, although other forms of grinders may be employed. The filter material of the invention issues from the grinder and is represented by the box 44 in FIG. 2. This material, like the material in container 23 of FIG. 1, may be subjected to further screening to remove undesirable "fines," if this is desired.

In FIG. 3 there are shown, somewhat diagrammatically, typical particles forming the filter material of the present invention as produced in the processes described above. These particles are, of course, shown on a much enlarged scale. From FIG. 3 it can be seen that all three of the particles shown there are roughly of the same size, in the sense that they would be assigned the same mesh number in a screening analysis, but they are quite different from one another in shape notwithstanding their similarity in size. Furthermore, each of these quite irregular in shape. Each particle has a larger surface area for its volume and weight than would a particle of the same weight, or of the same mesh size, but of a regular configuration, such as spherical. The particles of FIG. 3 do not pack together tightly because of their very irregular shape, and this loose packing property is of great advantage in producing a low pressure drop across a filter element containing such particles. In FIG. 3, each of the three particles of the filter material of the invention is labeled 50. Each of the particles 50 is made up of a number of smaller particles 51, of varying sizes, which are fused or sintered to each other in irregular fashion to form the larger particle 50. Each of the subparticles 51 was once a separate particle, making up the "fines" (and other particles) in the feed stock.

While it is preferred to form the filter material of the invention according to the process described herein, in one of its form, those skilled in the art may devise other ways of forming the filter material of the invention.

We claim:

1. A process for producing a particulate thermoplastic filter material having a low bulk density and a high surface-to-volume ratio and the particles of which have a dominant preselected size range comprising: forming a thin layer of a predetermined thickness of thermoplastic particles on a moving conveyor belt, said layer containing a high proportion of particles of a size smaller than said preselected size range; applying heat to the upper surface of said layer to raise the temperature to a level at which the surfaces of the said particles of thermoplastic material in the layer become soft, thereby sintering a portion of the particles in said layer to form a ribbon of sintered particles; separating said ribbon from the unfused particles in said layer by vibrating said layer; collecting the separated unfused particles into a separate container; returning said collected separated unfused particles to said thin layer at the point on said belt where said layer is being formed; feeding said separated ribbon of fused particles into a brush and screen grinder, rotating the brush at a circumferential speed greater than the translational speed of and in the same direction as the direction of movement of said separated ribbon of fused particles, feeding said ribbon into tangential contact with the circumference of the brush, and forcing said ribbon through the openings in the screen of the grinder, thereby grinding said ribbon to form said filter material; screening said filter material over a secondary screen unit and vibrating said filter material to separate particles of a size smaller than a predetermined size; and returning said last named particles of a size smaller than a predetermined size to form at least a portion of the particles in said thin layer.

* * * * *